US006896019B2

(12) United States Patent
Achard et al.

(10) Patent No.: US 6,896,019 B2
(45) Date of Patent: May 24, 2005

(54) LOG POSITIONING AND CONVEYING APPARATUS

(75) Inventors: René Achard, Montréal (CA); Robert Gauthier, Pointe-du-Lac (CA); Jean-Pierre Perreault, St-Jean-de-Matha (CA); Eddy Ste-Croix, Lanoraie (CA)

(73) Assignee: Sawquip International Inc., Lavaltrie (CA)

( * ) Notice: Subject to any disclaimer, the term of this patent is extended or adjusted under 35 U.S.C. 154(b) by 76 days.

(21) Appl. No.: 10/426,868

(22) Filed: May 1, 2003

(65) Prior Publication Data

US 2004/0216808 A1 Nov. 4, 2004

(51) Int. Cl.⁷ .................. B27F 15/013; B27F 31/00; B65G 37/00
(52) U.S. Cl. ............... 144/357; 144/3.1; 144/245.1; 144/246.1; 144/248.6; 198/624; 414/746.7
(58) Field of Search .............. 144/357, 3.1, 242.1, 144/246.1–248.7, 248.6, 245.1, 245.2; 83/436.3–436.9; 198/583, 624; 414/745.1, 746.7

(56) References Cited

U.S. PATENT DOCUMENTS

| 4,078,592 | A | | 3/1978 | Standal |
| 4,139,035 | A | | 2/1979 | Bystedt et al. |
| 4,373,563 | A | | 2/1983 | Kenyon |
| 4,383,561 | A | | 5/1983 | Gregoire et al. |
| 4,385,650 | A | * | 5/1983 | Schmidt ................ 144/248.7 |
| 4,471,823 | A | | 9/1984 | Wadell |
| 4,640,160 | A | | 2/1987 | Hards |
| 4,724,877 | A | * | 2/1988 | Culley, Jr. ............... 144/116 |
| 4,867,213 | A | | 9/1989 | Bolton et al. |
| 5,148,847 | A | | 9/1992 | Knerr |
| 5,421,385 | A | | 6/1995 | McGee |
| 5,429,161 | A | | 7/1995 | Allard |
| 5,649,580 | A | | 7/1997 | Mierau et al. |
| 5,884,682 | A | * | 3/1999 | Kennedy et al. .......... 144/357 |
| 5,907,986 | A | | 6/1999 | Buchacher |
| 6,216,756 | B1 | * | 4/2001 | Mason .................. 144/248.5 |
| 6,219,585 | B1 | | 4/2001 | Hughes et al. |
| 6,308,603 | B1 | * | 10/2001 | Murray .................... 83/209 |
| 6,470,932 | B1 | * | 10/2002 | Grivna et al. ............ 144/373 |

* cited by examiner

*Primary Examiner*—Allen Ostrager
*Assistant Examiner*—Shelley Self
(74) *Attorney, Agent, or Firm*—François Martineau

(57) ABSTRACT

The log positioning and conveying apparatus is used for conveying a log from an upstream end to a downstream end, and for positioning a log according to a predetermined downstream position. The apparatus comprises an open frame and a number of powered conveying rollers arranged therein in a row. These rollers, in addition to being rotatable, are displaceable in two directions relative to the open frame, namely, in a vertical direction for correcting the position of the log vertically relative to the open frame, and in a horizontal direction transversal to the longitudinal axis of the conveying apparatus, for correcting the position of the log transversely relative to the longitudinal axis.

15 Claims, 8 Drawing Sheets

Coupe VI-VI

LOG POSITIONING AND CONVEYING APPARATUS

FIELD OF THE INVENTION

The present invention relates to log conveyors for feeding logs to a chip-and-saw apparatus, and more particularly to a log positioning conveyor capable of adjusting the position of the log.

BACKGROUND OF THE INVENTION

For environmental and economical reasons, it is essential to maximize the production of lumber from each log. To achieve the best possible wood yield from a log, the log has to be suitably positioned in relation to the stationary sawing members of a sawing apparatus in which the log is fed, both with respect to the angular position of the log about its longitudinal axis and the orientation and position of the longitudinal axis of the log.

Modern log-positioning machines are computer-assisted. It is known to scan the front face of the log with an optical scanner, and to subsequently analyze the log image by means of a computer program. The computer can command a log turning apparatus to adjust the angular position of the log about its longitudinal axis, according to a computed optimal log position.

However, some problems exist in the existing systems. Firstly, the entire geometry of the log is not computed, and consequently, the log-scan of the front face of the log is not necessarily representative of the entire length of the often longitudinally irregular log. Thus, even if the log is rotated to obtain an optimized log position according to the front face of the log, the overall yield from the log may not be optimal. Also, although a certain optimal log position is computed and the log turning apparatus is controlled to rotate the log according to the desired position, the effective real position of the log may not be exactly as desired, since the log may react in an unforeseen manner while it is rotated, and it may accidentally be positioned differently from the computed optimal position.

SUMMARY OF THE INVENTION

The invention relates to a log positioning and conveying apparatus defining an upstream end and a downstream end, and a longitudinal axis extending between said upstream and downstream ends, for positioning a log defining a peripheral surface according to a predetermined downstream position, said log positioning and conveying apparatus comprising:
an open frame;
at least two rollers rotatably carried by said frame and defining respective rotational axes arranged transversally to and in a spaced-apart fashion along said longitudinal axis of said log positioning and conveying apparatus;
first selectively powered roller actuators carried by said frame and allowing said rollers to be selectively independently displaced in a first direction transversal to said longitudinal axis;
second selectively powered roller actuators carried by said frame and allowing said rollers to be selectively independently displaced in a second direction transversal to said longitudinal axis and transversal to said first direction; and
third selectively powered roller actuators carried by said frame and capable of selectively rotating said rollers about their respective rotational axes;
wherein each said roller can be controlled by a corresponding one of said third roller actuators to be rotated for conveying a log along said longitudinal axis towards said downstream end, and by corresponding ones of said first and second actuators to be displaced along said first and second directions respectively for engaging the peripheral surface of the log and gradually correcting the position of the log for positioning the log according to its predetermined downstream position as it is being conveyed towards said downstream end, whereby a dynamic log channel is defined on a load-bearing surface of said rollers for supporting the log in said log channel.

In one embodiment, said rotational axes of said rollers are parallel and horizontal.

In one embodiment, said log positioning and conveying apparatus further comprises at least two additional rollers carried by said frame and each spacedly overlying a corresponding one of the first-named rollers and forming longitudinally successive pairs of vertically spaced-apart co-operating rollers therewith, wherein each roller of said pairs of co-operating rollers is controlled by a corresponding one of said third roller actuators to be rotated for conveying a log along said longitudinal axis towards said downstream end, and by corresponding ones of said first and second actuators to be displaced along said first and second directions respectively for engaging the peripheral surface of the log and correcting the position of the log for positioning the log according to its predetermined downstream position as it is being conveyed towards said downstream end, whereby a dynamic log channel is defined between two rollers forming each said pair of co-operating rollers for receiving the log in said log channel, with the two rollers forming each said pair of rollers being destined to engage opposite sides of the peripheral surface of the log as it engages said log channel.

In one embodiment, said open frame further comprises a number of roller units moveably mounted thereon, each said pair of co-operating rollers being carried by a corresponding roller unit; wherein each said second actuator is operatively connected to a corresponding one of said roller units; and wherein upon selective activation of said second actuators, said roller units will be independently displaced along said second direction, with said rollers being displaced in said second direction along with said corresponding roller unit.

In one embodiment, said open frame is provided with a number of rail members thereon arranged parallel to each other and parallel to said second direction, and wherein said roller units are provided with track members that engage corresponding rail members, whereby said roller units can be slideably displaced along said second direction.

In one embodiment, said rollers define an outer peripheral wall and are provided with spikes radially projecting from said outer peripheral wall.

In one embodiment, said roller units each pivotally carry a pair of pivotable arms each controlled in its pivotal displacement by a corresponding one of said first roller actuators, each said arm of said pair of pivotable arms rotatably carrying a roller.

The present invention also relates to a log processing system comprising:
a) a log positioning and conveying apparatus defining an upstream end and a downstream end, and a longitudinal axis extending between said upstream and downstream ends, for positioning a log defining a peripheral surface according to a predetermined downstream position, said log positioning and conveying apparatus comprising:
an open frame;
at least two rollers rotatably carried by said frame and defining respective rotational axes arranged transversally to and in a spaced-apart fashion along said longitudinal axis of said log positioning and conveying apparatus;

first selectively powered roller actuators carried by said frame and allowing said rollers to be selectively independently displaced in a first direction transversal to said longitudinal axis;

second selectively powered roller actuators carried by said frame and allowing said rollers to be selectively independently displaced in a second direction transversal to said longitudinal axis and transversal to said first direction; and third selectively powered roller actuators carried by said frame and capable of selectively rotating said rollers about their respective rotational axes;

wherein each said roller can be controlled by a corresponding one of said third roller actuators to be rotated for conveying a log along said longitudinal axis towards said downstream end, and by corresponding ones of said first and second actuators to be displaced along said first and second directions respectively for engaging the peripheral surface of the log and gradually correcting the position of the log for positioning the log according to its predetermined downstream position as it is being conveyed towards said downstream end, whereby a dynamic log channel is defined on a load-bearing surface of said rollers for supporting the log in said log channel, said log processing system further comprising:

b) a control center destined to possess data representing the shape of the log being conveyed through said log positioning and conveying apparatus and to compute an optimal log position for sawing a log according to an optimal wood yield, with said predetermined downstream position corresponding to said optimal log position, said first and second actuators being controlled by said control center; and c) at least one log position monitoring scanner each capable of scanning a plane intersecting said log channel upstream of a corresponding one of said rollers, each said at least one monitoring scanner being operatively connected to said control center for forwarding real-time log position data concerning the position of a log;

wherein said control center will control said first and second actuators to move said rollers along said first and second directions respectively for engaging the peripheral surface of the log and for correcting a deficient position of a log being conveyed by said log positioning and conveying apparatus according to said data representing the shape of the log and to said real-time log position data received from said at least one monitoring scanner.

In one embodiment, said log processing system further comprises a log-shape scanner linked to said control center and destined to scan a log for forwarding to said control center said data representing the shape of the log being conveyed through said log positioning and conveying apparatus.

In one embodiment, said log processing system further comprises a log turner linked to said control center, for rotating a log about its log longitudinal axis.

In one embodiment, said monitoring scanners are infrared optical detectors.

DETAILED DESCRIPTION OF THE EMBODIMENTS

Figure 1:
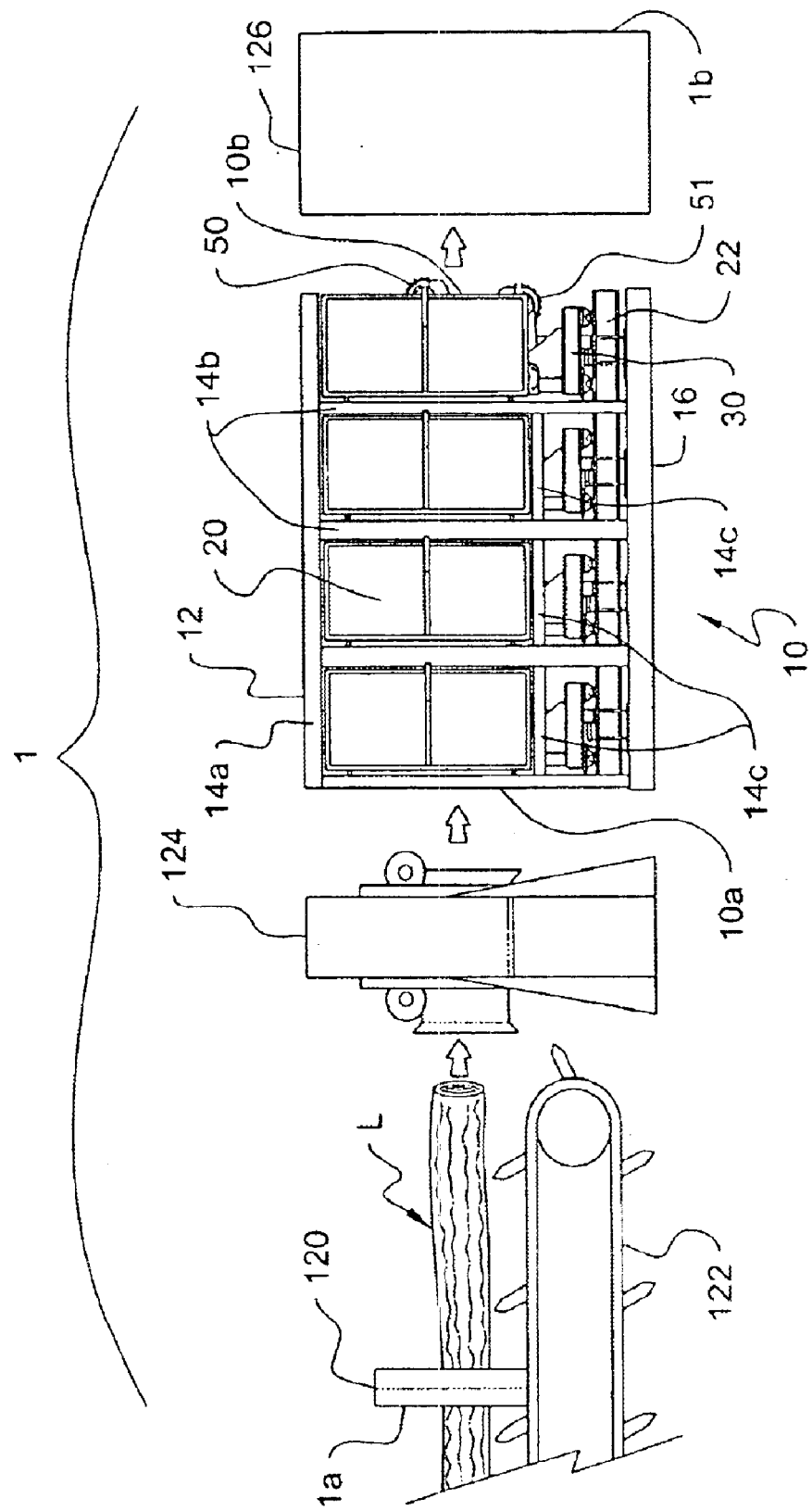
FIG. 1 is a side elevation of a log-processing system comprising the end portion of a log conveyor, a log-shape scanner, a log turner, a log positioning and conveying apparatus according to the present invention, and a sawing apparatus, with a log being carried by the conveyor being partly shown.

With reference to FIG. 1, there is shown a log processing system 1 comprising a log conveyor 122 of known construction with a log-shape scanner 120 mounted thereon, a log turning apparatus 124 of known construction, a log positioning and conveying apparatus 10 according to the present invention, and a sawing apparatus 126 of known construction. Log-processing system 1 is used for conveying a log L from an upstream end 1a defined immediately upstream of log-shape scanner 120, to a downstream end 1b defined immediately downstream of sawing apparatus 126, the log being properly positioned and cut while it is being conveyed by system 1, as described hereinafter.

As shown in appended FIGS. 1–7, log conveying and sawing apparatus 10 comprises an open frame 12, rollers 50, 51, lateral actuators 40, arm-pivoting actuators 44, 45, roller rotation-inducing motors 55, 56, and log-position monitoring devices 60a, 60b. Apparatus 10 further defines an upstream end 10a and a downstream end 10b, and a longitudinal axis 11 extending from upstream end 10a to downstream end 10b.

Figure 2:
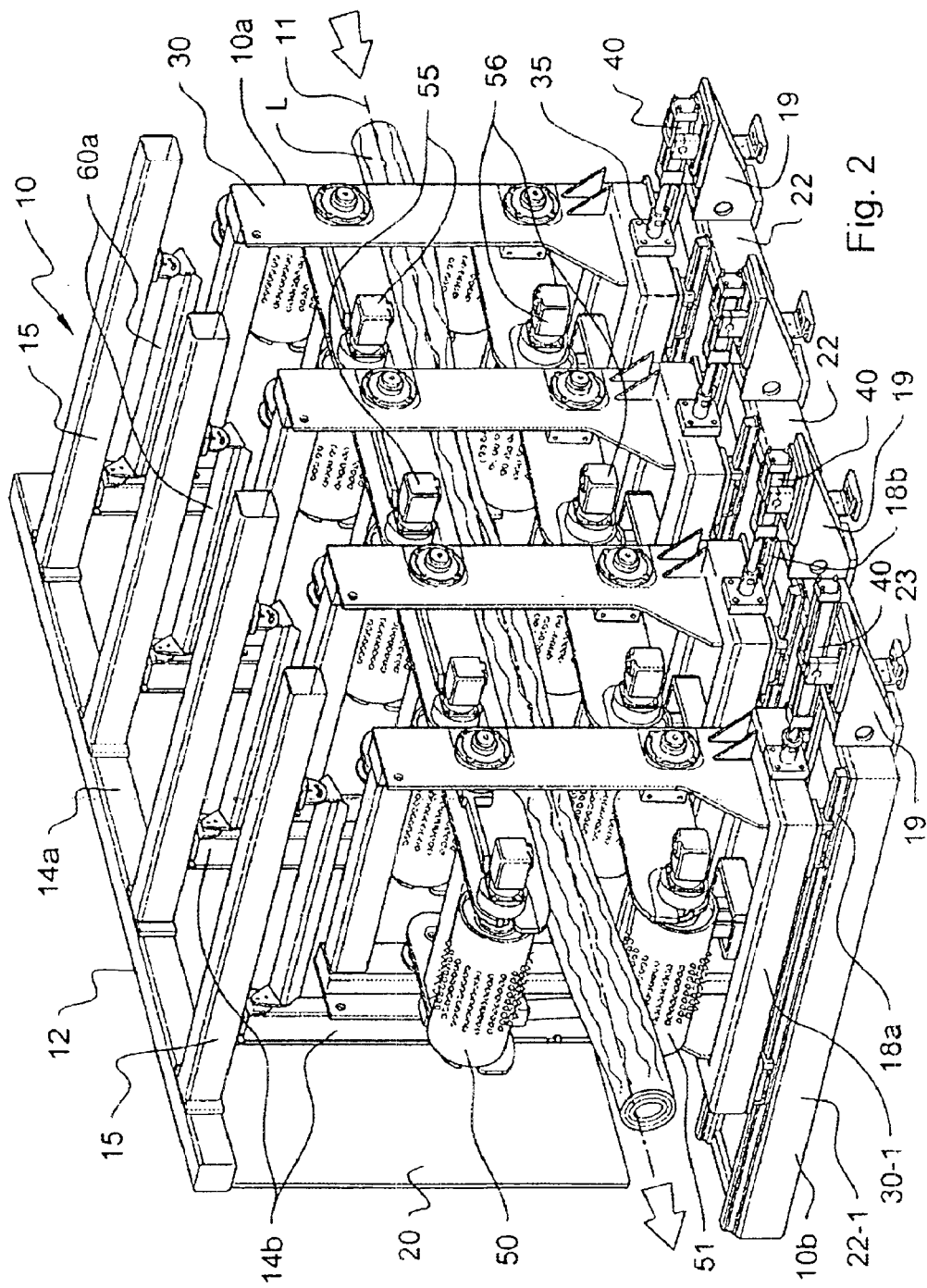
FIG. 2 is an enlarged perspective view of the log positioning and conveying apparatus of the system of FIG. 1 with the viewing angle being inverted relative to FIG. 1, i.e. that the downstream end of the apparatus is located on the left-hand side in FIG. 2, part of the frame in the foreground and the base of the apparatus being removed for clarity of the view, FIG. 2 further showing a log being conveyed in the apparatus.
Figure 3:
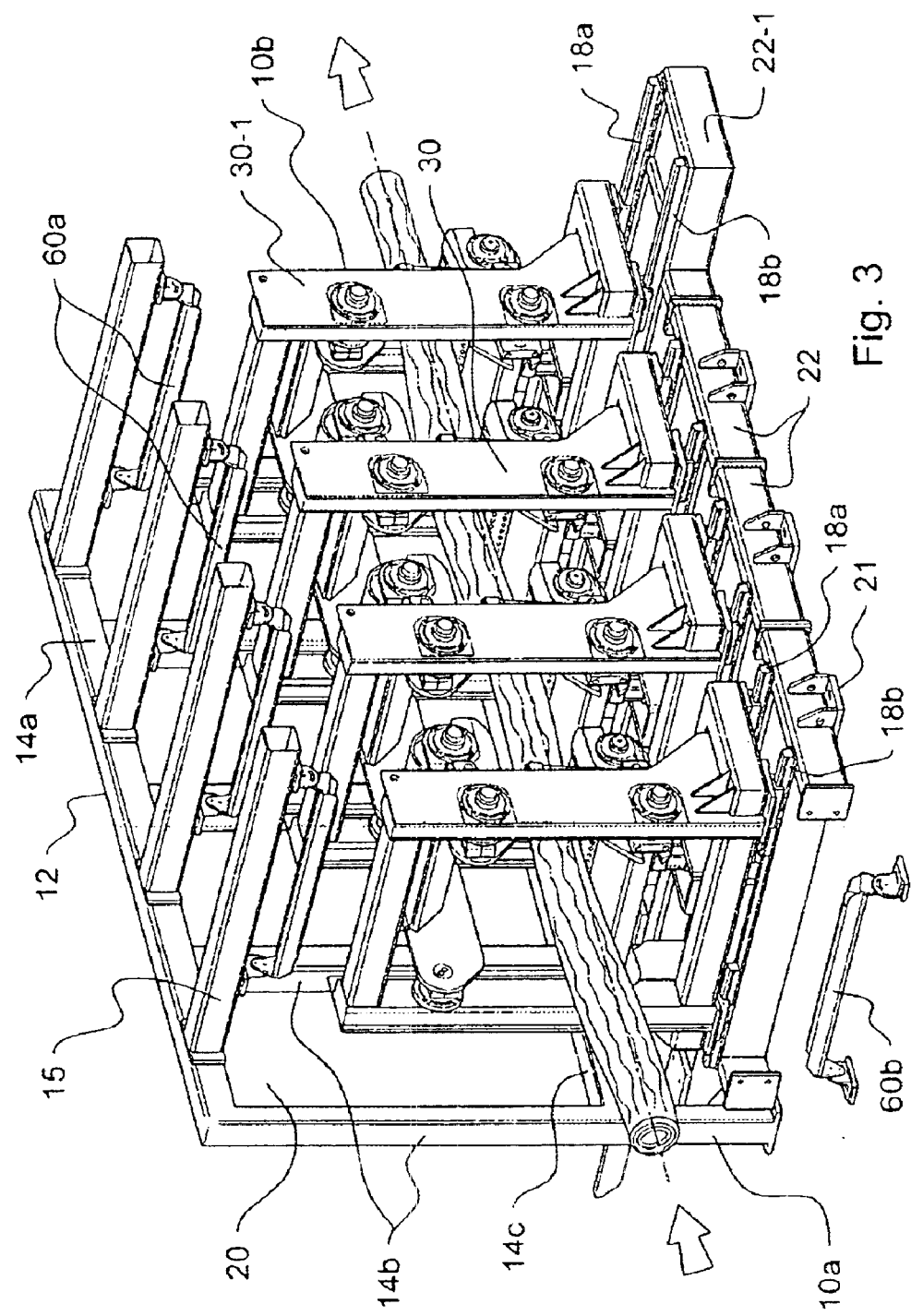
FIG. 3 is similar to FIG. 2, but is shown from an inverted angle relative to FIG. 2, i.e. with the downstream end located on the right-hand side in FIG. 3, with part of the frame in the foreground of FIG. 3 being removed for clarity of the view.

FIG. 1–3 show log conveying and sawing apparatus 10. However, in FIG. 2, the orientation of apparatus 10 is inverted relative to the angle of FIGS. 1 and 3, i.e. downstream end 10b is on the left-hand side in FIG. 2 while it is on the right-hand side in FIGS. 1 and 3.

FIGS. 1–3 show that frame 12 comprises a ground-resting base 16, four pairs of spaced-apart upright beams 14b upstanding from and integrally fixed to base 16, a pair of longitudinal top struts 14a each integrally linking the top ends of the four beams 14b of a same side, four top crossbars 15 integrally linking top struts 14a, and lateral reinforcement bars 14c linking each two successive beams 14b. A protective side panel 20 is mounted to each beam 14b downstream thereof. A longitudinal log channel extends between the two sets of four aligned beams 14b and between top crossbars 15 and base 16, as further detailed hereinafter.

Base 16 supports four roller units mounting benches 22 that are serially longitudinally fixed to base 16 with respective fixing brackets 21, 23 that are bolted to base 16. Each bench 22 integrally carries a pair of spaced-apart rail members 18a, 18b. Each bench 22 forms a rectangular frame defining a central bench opening therein. Each bench 22 is also provided with an actuator bracket 19 carrying a lateral actuator 40 used for selectively shifting roller units 30 laterally, as described hereinafter.

Figure 4:
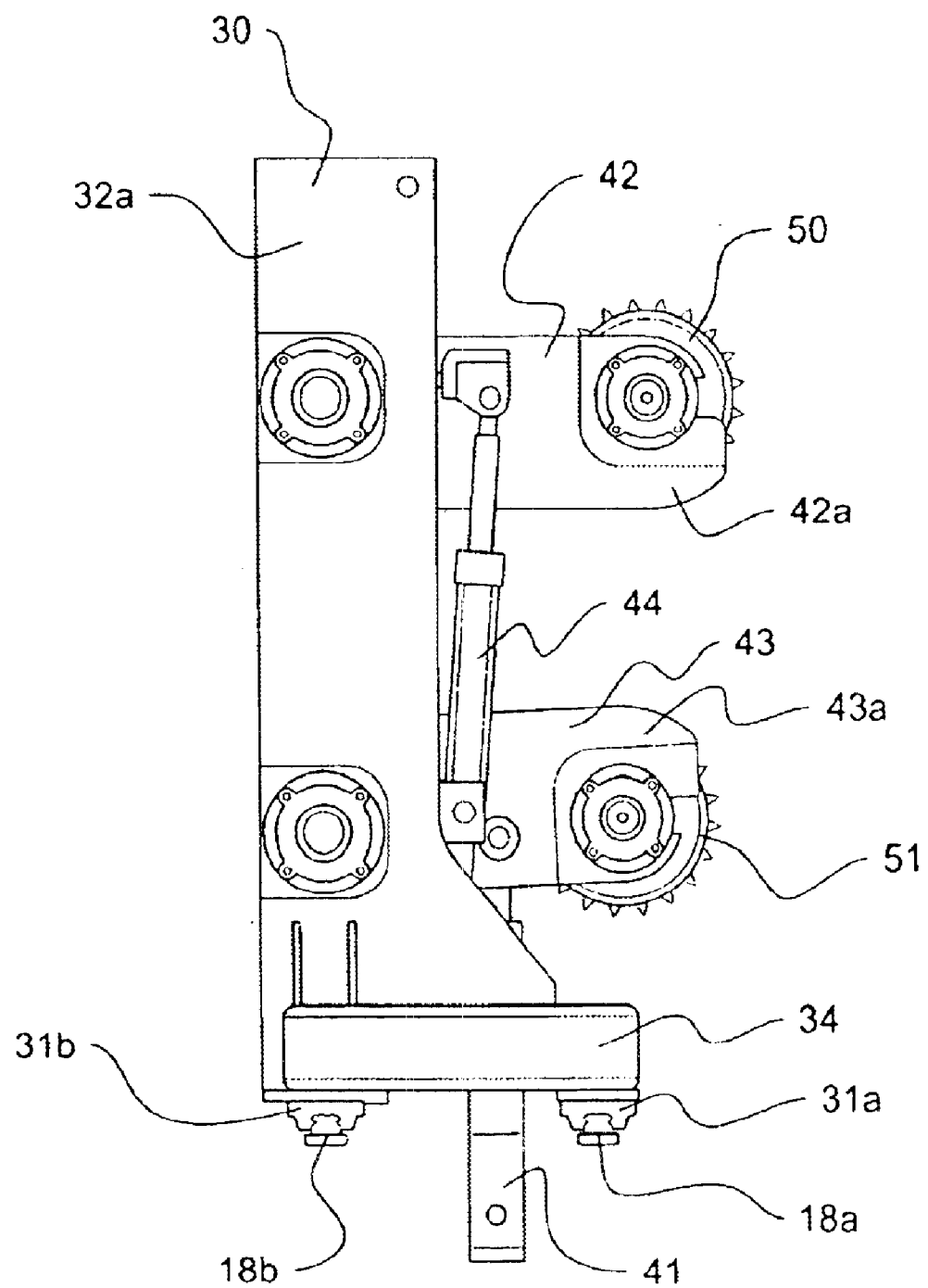
FIG. 4 is an enlarged side elevation of a roller unit of the log positioning and conveying apparatus of FIGS. 2 and 3.
Figure 5:
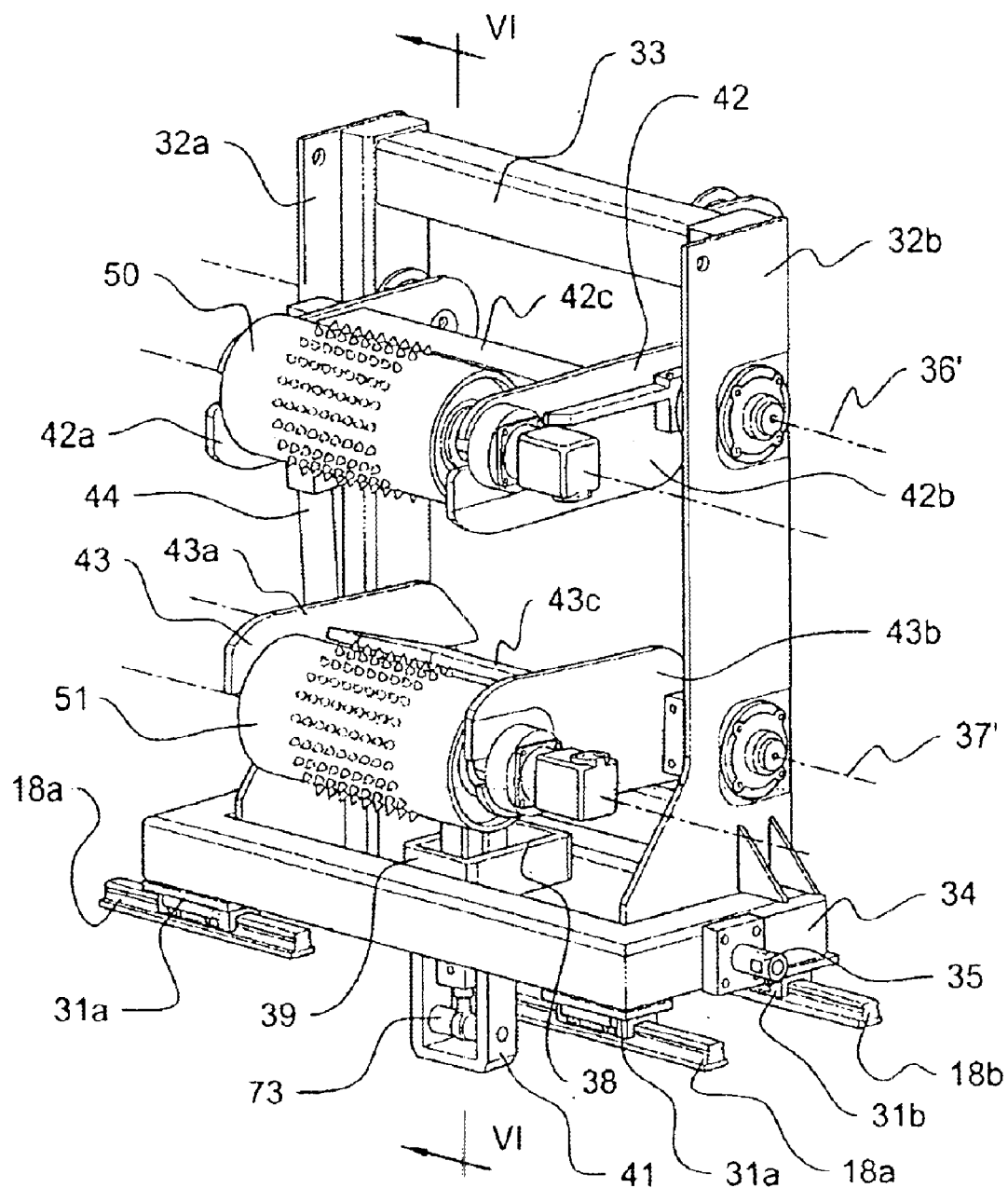
FIG. 5 is a perspective view of the roller unit of FIG. 4.
Figure 6:
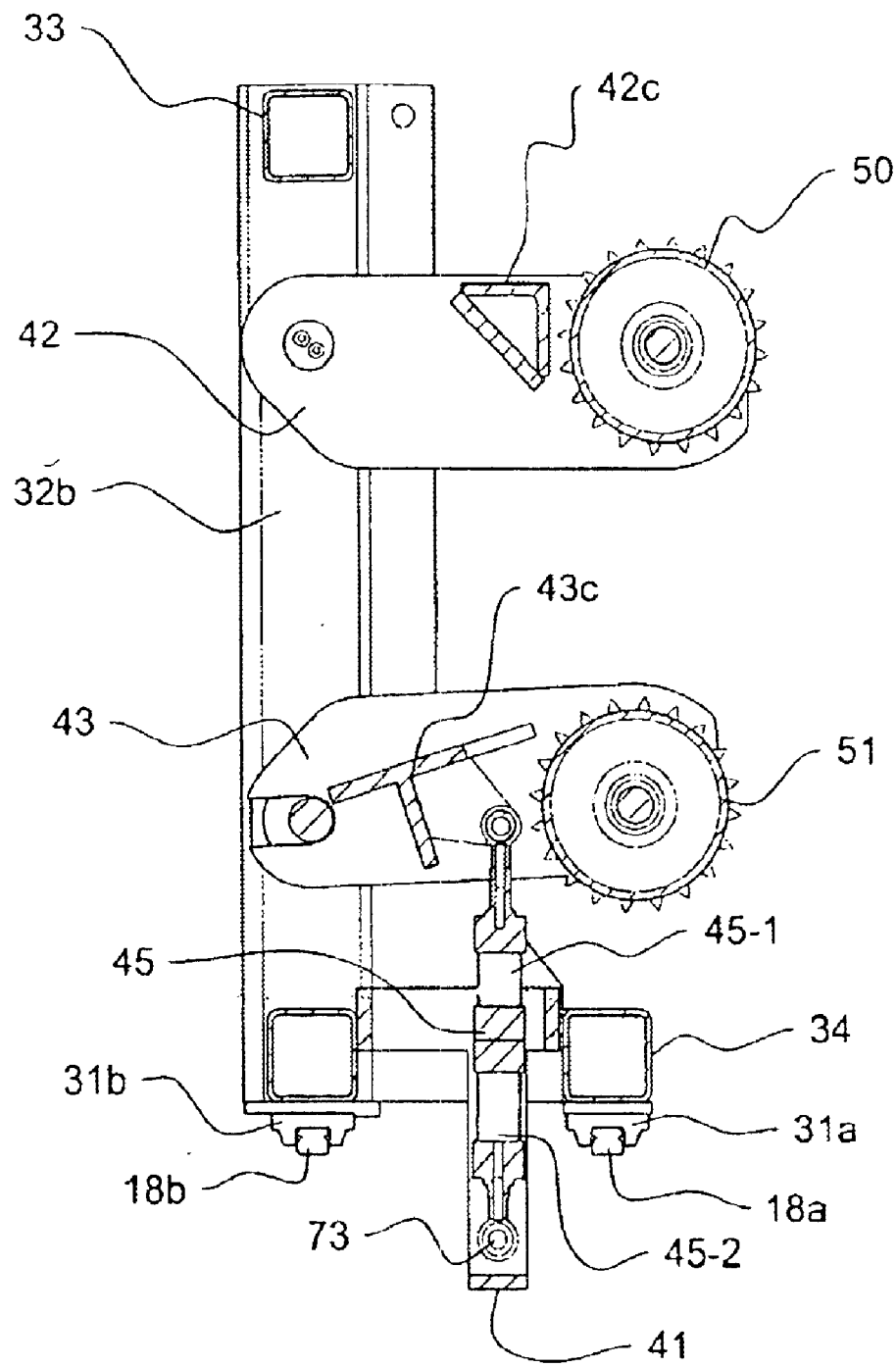
FIG. 6 is a cross-sectional view of the roller unit taken along lines VI—VI of FIG. 5.

Four laterally shiftable roller units 30, as introduced hereinabove, are mounted onto corresponding roller-unit mounting benches 22. FIGS. 4–6 show that each roller unit 30 comprises a table 34, two upright plates 32a, 32b integrally attached to table 34 and a top crossbar 33 extending between and attached to the top end portion of plates 32a, 32b. An opening 38 is provided in the central region of table 34 and a lip 39 contouring opening 38 projects upwardly from the top surface of table 34. A U-shaped casing 41 projects downwardly from the bottom surface of table 34 into the above-mentioned central bench opening, with its two side arms being fixedly attached to lip 39 and with its open top registering with opening 38.

On the bottom surface of table 34, two longitudinally spaced-apart pairs of transversely aligned rail-engaging track members 31a, 31b are provided in order for each roller unit 30 to be guided in its slideable engagement on rail members 18a, 18b.

Roller unit 30 further comprises a protruding finger member 35 fixedly and firmly attached to the side of table 34 adjacent plate 32b. Finger member 35 links roller unit 30 to its corresponding lateral actuator 40.

Lateral actuators 40 are hydraulic cylinders, each firmly affixed to a corresponding bracket 19 and with its piston free end being attached to the finger member 35 of a corresponding roller unit 30. Roller units 30 being slideably mounted onto a corresponding bench 22, upon selective activation of actuators 40, each roller unit 30 can be independently shifted transversally relative to longitudinal axis 11.

Each roller unit 30 further comprises a pair of vertically spaced-apart, H-shaped pivot arms 42, 43 defining respective transversally spaced-apart side plates 42a, 42b and 43a, 43b integrally linked by crossbars 42c and 43c at an intermediate portion of side plates 42a, 42b and 43a, 43b. Side plates 42a, 43a and 42b, 43b are attached at a first pivot end thereof to the roller unit upright plates 32a and 32b, respectively. Thus, arms 42 and 43 can pivot about respective pivotal axes 36' and 37'. Side plates 42a, 42b and 43a, 43b further define roller free ends opposite their pivot ends.

Roller unit 30 is further provided with arm-pivoting actuators 44 and 45. Actuator 44 is a hydraulic cylinder pivotally attached at one end to the outer surface of side plate 42a of arm 42, and is pivotally attached at its other end to upright plate 32a of roller unit 30. When activated, actuator 44 can hence pivot arm 42 about pivotal axis 36'. Actuator 45 comprises two back-to-back hydraulic cylinders 45-1 and 45-2. Actuator 45 extends through opening 38 in table 34, and is pivotally attached at one end to crossbar 43c of arm 43 and the other end to a pivotal joint 73 provided within casing 41. When activated, actuator 45 can hence pivot arm 43 about pivotal axis 37'.

Arms 42, 43 carry rollers 50, 51 that are journalled at the above-mentioned roller ends of side plates 42a, 42b and 43a, 43b respectively. Rotation actuators in the form of rotation-inducing motors 55 and 56 are carried by arms 42 and 43, respectively, and control the rotation of rollers 50 and 51.

A dynamic log channel is defined within apparatus 10, extending between each pair of vertically spaced rollers 50, 51 of all four consecutive roller units 30. This log channel is said to be dynamic since, upon selective activation of actuators 40, 44 and 45, each roller 50, 51 will be displaced vertically and transversely, and the log channel position will thus vary over time.

Rollers 50, 51 are provided with spikes radially projecting from their outer peripheral wall.

Figure 7:
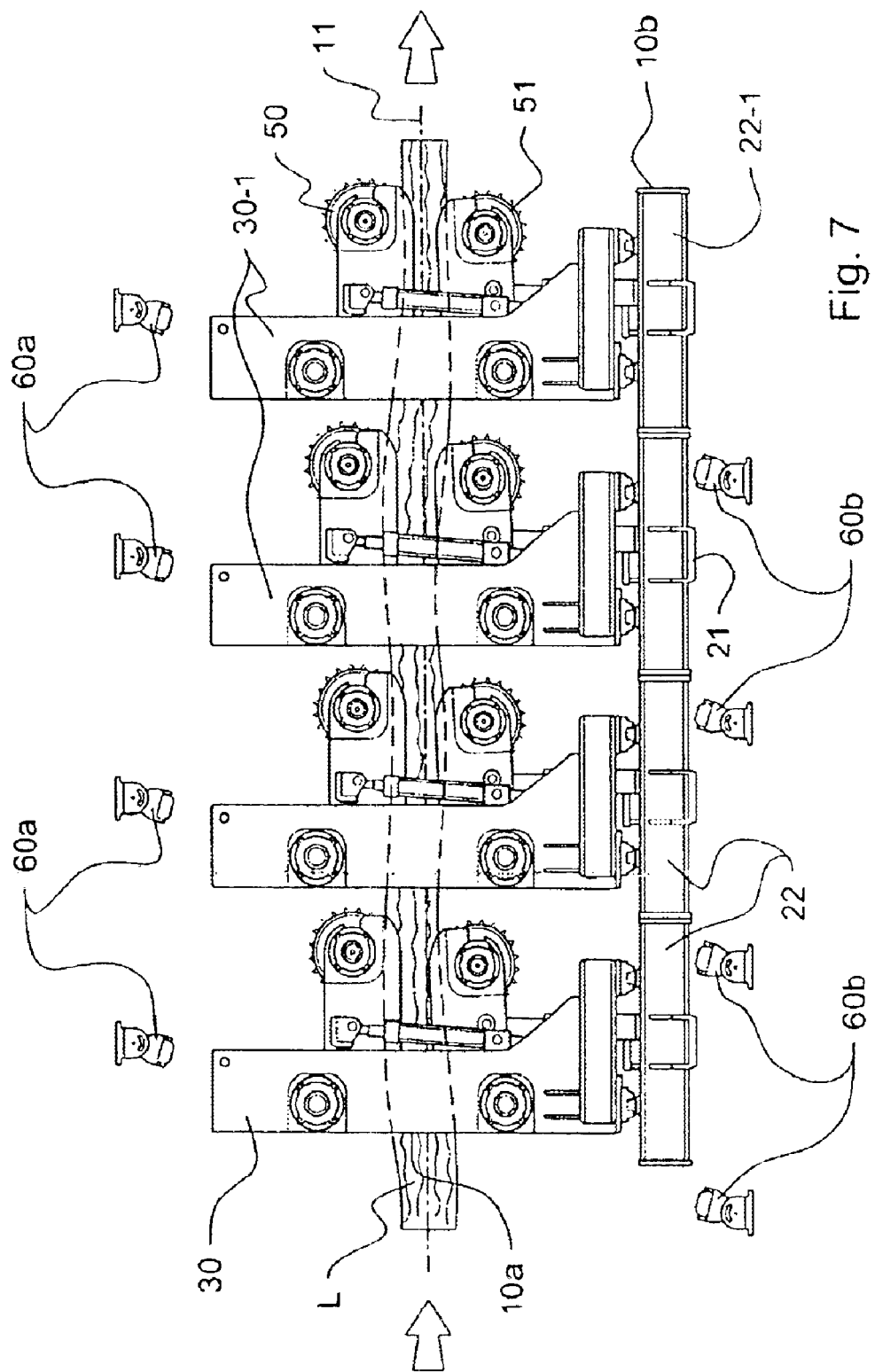
FIG. 7 is a side elevation of the roller units, the benches on which they are mounted and the optical scanners of the log positioning and conveying apparatus of FIG. 1, with a log being conveyed by the apparatus.

As shown in FIGS. 2, 3 and 7, apparatus 10 is provided with four pairs of co-operating log-position monitoring scanners 60a, 60b. In one embodiment, scanners 60a, 60b are infrared optical scanners. Each top monitoring scanner 60a is provided on a distinct top beam 15 of frame 12. Four bottom monitoring scanners 60b are attached to base 16, although they may also simply rest on the ground or on another structure underlying benches 22.

Monitoring scanners 60a, 60b function by pairs, and each scanner of a same pair is arranged in facing alignment with the other scanner of that pair. Top scanners 60a are oriented downwardly, and bottom scanners 60b are oriented upwardly. Each pair of log-monitoring scanner 60a, 60b is located upstream of a corresponding roller unit 30. In one embodiment, top scanner 60a is an infrared wave emitter and bottom scanner 60b is an infrared wave receiver.

Figure 8:
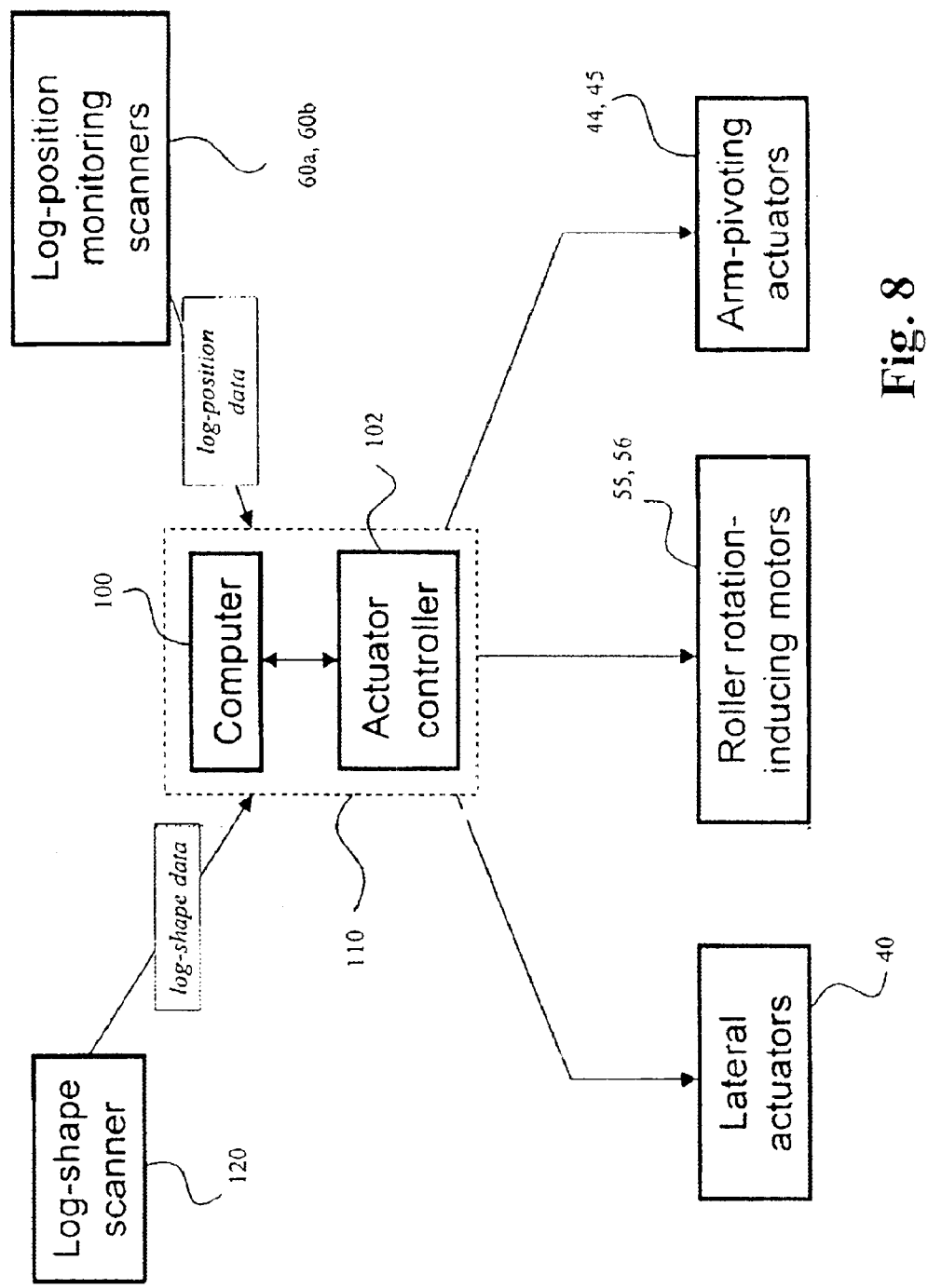
FIG. 8 is a block-diagram suggesting the interaction between different components of the log-processing system of FIG. 1.

As schematically shown in FIG. 8, apparatus 10 cooperates with a control center 110. Control center 110 comprises a computer 100 and an actuator controller 102 communicatively linked together. Actuator controller is linked to actuators 40, 44, 45, 55 and 56 and can selectively control the activation thereof. Computer 100 is operatively connected to log-shape scanner 120 and to log-position monitoring scanners 60a, 60b and can receive information therefrom.

In use, a log L is conveyed by conveyor C towards log processing system 1. While being conveyed onto conveyor 122, log L will pass through log-shape scanner 120. Log-shape scanner 120 is of known construction, and will obtain data representative of the three-dimensional shape of log L and transmit this log-shape data to computer 100 of control center 110. This log-shape data can be for example an assembly of multiple successive equally spaced two-dimensional image scans from which the entire log shape is more or less precisely determined. A three-dimensional virtual model of the log can then be created by computer 100, which is representative of the real shape of the log. From this three-dimensional model, an optimal wood yield can be computed by computer 100 according to known yield computing methods.

As log L is conveyed beyond the free extremity of conveyor 122, it will engage log turner 124, that is of known construction, that will both convey the log towards apparatus 10 and rotate the log about its own log axis according to a desired angular position. Thus, a log L entering apparatus 10 will have a desired angular position relative to the log's own longitudinal axis.

Log L will be conveyed through apparatus 10 by means of its gradual engagement between rollers 50, 51 that are powered into rotation by their respective motors 55, 56. The optional spikes on the roller outer surfaces help prevent the rollers from slipping on the log surface and ensure proper conveyance of log L along the apparatus longitudinal axis 11. More particularly, the top rollers 50 will initially be positioned at a topmost limit position, and the bottom rollers 51 will initially be positioned at a lowermost limit position. As log L enters the apparatus upstream end 10a, the first pair of top and bottom rollers 50, 51 will be displaced by their respective actuators 44, 45 towards log L to engage the log outer surface. The rotating rollers 50, 51, pivotally biased by means of their respective arms 42, 43 against the log outer surface with actuators 44, 45, will consequently frictionally move log L along longitudinal axis 11. A similar action will successively occur with all pairs of rollers 50, 51 downstream of the first, upstream pair of rollers 50, 51.

The initial and subsequent engagement of all rollers 50, 51 against the outer surface of log L will be determined by computer 100. Thus, the vertical displacement of rollers 50, 51 for engaging the outer surface of log L may be accomplished differently for different log shapes. This will help provide a proper conveyance of log L along longitudinal axis 11 notwithstanding particular log shapes. As log L advances along longitudinal axis 11, rollers 50, 51 are thus likely to move vertically in an up-and-down motion, to compensate for the often irregular log shape, according to the control exercised by control center 110 on actuators 44, 45.

Also, as log L advances along longitudinal axis 11, it will be positioned according to a predetermined downstream position (relative to apparatus 10) as computed by computer 100. Indeed, sawing apparatus 126 having stationary blades, the latter will cut log L according to the linear direction in which log L is conveyed through sawing apparatus 126. Thus, once the virtual three-dimensional model of log L is accomplished and an optimal yield is determined by computer 100, an optimal log downstream position will be determined which will allow log L to be conveyed through sawing apparatus 126 to cut log L to obtain the computed optimal yield.

This predetermined downstream position of log L relative to apparatus 10, will be obtained by adjusting the horizontal and vertical position of log L as it is conveyed by apparatus 10. The vertical adjustment of the log position will be accomplished by vertically independently moving rollers 50, 51 by means of actuators 44, 45 as explained hereinabove. The horizontal adjustment of the log position will be accomplished by horizontally and transversely independently moving roller units 30 by means of actuators 40. Thus, the position of log L and its angle of incidence, as it is discharged at the downstream end 10b of apparatus 10 towards sawing apparatus 126, will be set according to the predetermined downstream position, to obtain the optimal computed wood yield from log L.

Considering that log L may be accidentally displaced by rollers 50, 51 in an effective real position that would be different than an anticipated computed position of log L, the co-operating pairs of monitoring scanners 60a, 60b will help correct such a deficient log positioning. Indeed, as log L moves along longitudinal axis 11, each pair of monitoring scanners 60a, 60b will scan a detection plane intersecting the log channel and thus allowing control center 110 to verify the real position of log L upstream of each roller unit 30. If the real position of log L, as determined by the pairs of co-operating scanners 60a, 60b, is different from the anticipated position of log L, then control center 110 will command actuators 44, 45 and/or 40 to move rollers 50, 51 vertically and/or transversely to correct the position of log L in real-time.

In order to perform maintenance tasks on sawing apparatus 126, apparatus 10 has been provided with a downstream bench 22, referred to as bench 22-1 in the annexed FIGS. 2 and 3, that is wider than the other benches 22. Consequently, the downstream roller unit 30 (referred to as roller unit 30-1 in FIGS. 2 and 3) can be shifted to a lateral limit position which allows it to clear the central downstream end portion of apparatus 10, in order to allow a human operator to step onto bench 22-1 to perform maintenance tasks on sawing apparatus 126 or within positioning apparatus 10.

Suitable power means (not shown) are connected to actuators 40, 44, 45, roller motors 55, 56, control center 110, conveyor 122, log-shape scanner 120, log turner 124, monitoring scanners 60a, 60b, sawing apparatus 126, and any other element that might require power.

In an alternate embodiment of the invention (not shown in the appended drawings), instead of having two rows of rollers (a top row of rollers formed by four longitudinally consecutive rollers 50 and a bottom row of rollers formed by four longitudinally consecutive rollers 51), the positioning and conveying apparatus of the present invention could comprise a single bottom row of four longitudinally consecutive rollers fixed to open frame 12. This bottom row of rollers would still be controlled by rotation inducing motors similar to motors 55, and could thus be rotated to convey a log on their upper load-bearing surface from upstream end 10a to downstream end 10b of the apparatus. In this alternate embodiment, the rollers forming the single bottom row of rollers would still be displaceable transversally to longitudinal axis 11, and vertically, to achieve predetermined downstream position of log L.

What is claimed is:

1. A log positioning and conveying apparatus defining an upstream end and a downstream end, and a longitudinal axis extending between said upstream and downstream ends, for positioning a log defining a peripheral surface according to a predetermined downstream position, said log positioning and conveying apparatus comprising:

an open frame;

at least two rollers rotatably carried by said frame and defining respective rotational axes arranged transversally to and in a spaced-apart fashion along said longitudinal axis of said log positioning and conveying apparatus;

first selectively powered roller actuators carried by said frame and allowing said rollers to be selectively independently displaced in a first direction transversal to said longitudinal axis;

second selectively powered roller actuators carried by said frame and allowing said rollers to be selectively independently displaced in a second direction transversal to said longitudinal axis and transversal to said first direction; and third selectively powered roller actuators carried by said frame and capable of selectively rotating said rollers about their respective rotational axes;

wherein each said roller can be controlled by a corresponding one of said third roller actuators to be rotated for conveying a log along said longitudinal axis towards said downstream end, and by corresponding ones of said first and second actuators to be displaced along said first and second directions respectively for engaging the peripheral surface of the log and gradually correcting the position of the log for positioning the log according to its predetermined downstream position as it is being conveyed towards said downstream end, whereby a dynamic log channel is defined on a load-bearing surface of said rollers for supporting the log in said log channel.

2. A log positioning and conveying apparatus as defined in claim 1, wherein said rotational axes of said rollers are parallel and horizontal.

3. A log positioning and conveying apparatus as defined in claim 2, further comprising at least two additional rollers carried by said frame and each spacedly overlying a corresponding one of the first-named rollers and forming longitudinally successive pairs of vertically spaced-apart co-operating rollers therewith, wherein each roller of said pairs of co-operating rollers is controlled by a corresponding one of said third roller actuators to be rotated for conveying a log along said longitudinal axis towards said downstream end, and by corresponding ones of said first and second actuators to be displaced along said first and second directions respectively for engaging the peripheral surface of the log and correcting the position of the log for positioning the log according to its predetermined downstream position as it is being conveyed towards said downstream end, whereby a dynamic log channel is defined between two rollers forming each said pair of co-operating rollers for receiving the log in said log channel, with the two rollers forming each said pair of rollers being destined to engage opposite sides of the peripheral surface of the log as it engages said log channel.

4. A log positioning and conveying apparatus as defined in claim 3, wherein said open frame further comprises a number of roller units moveably mounted thereon, each said pair of co-operating rollers being carried by a corresponding roller unit; wherein each said second actuator is operatively connected to a corresponding one of said roller units; and wherein upon selective activation of said second actuators, said roller units will be independently displaced along said second direction, with said rollers being displaced in said second direction along with said corresponding roller unit.

5. A log positioning and conveying apparatus as defined in claim 4,
wherein said open frame is provided with a number of rail members thereon arranged parallel to each other and parallel to said second direction, and wherein said roller units are provided with track members that engage corresponding rail members, whereby said roller units can be slideably displaced along said second direction.

6. A log positioning and conveying apparatus as defined in claim 1,
wherein said rollers define an outer peripheral wall and are provided with spikes radially projecting from said outer peripheral wall.

7. A log positioning and conveying apparatus as defined in claim 4, wherein said roller units each pivotally carry a pair of pivotable arms each controlled in its pivotal displacement by a corresponding one of said first roller actuators, each said arm of said pair of pivotable arms rotatably carrying a roller.

8. A log processing system comprising:
a) a log positioning and conveying apparatus defining an upstream end and a downstream end, and a longitudinal axis extending between said upstream and downstream ends, for positioning a log defining a peripheral surface according to a predetermined downstream position, said log positioning and conveying apparatus comprising:
an open frame;
at least two rollers rotatably carried by said frame and defining respective rotational axes arranged transversally to and in a spaced-apart fashion along said longitudinal axis of said log positioning and conveying apparatus;
first selectively powered roller actuators carried by said frame and allowing said rollers to be selectively independently displaced in a first direction transversal to said longitudinal axis;
second selectively powered roller actuators carried by said frame and allowing said rollers to be selectively independently displaced in a second direction transversal to said longitudinal axis and transversal to said first direction; and
third selectively powered roller actuators carried by said frame and capable of selectively rotating said rollers about their respective rotational axes;
wherein each said roller can be controlled by a corresponding one of said third roller actuators to be rotated for conveying a log along said longitudinal axis towards said downstream end, and by corresponding ones of said first and second actuators to be displaced along said first and second directions respectively for engaging the peripheral surface of the log and gradually correcting the position of the log for positioning the log according to its predetermined downstream position as it is being conveyed towards said downstream end, whereby a dynamic log channel is defined on a load-bearing surface of said rollers for supporting the log in said log channel, said log processing system further comprising:
b) a control center destined to process data representing the shape of the log being conveyed through said log positioning and conveying apparatus and to compute an optimal log position for sawing a log according to an optimal wood yield, with said predetermined downstream position corresponding to said optimal log position, said first and second actuators being controlled by said control center; and
c) at least one log position monitoring scanner capable of scanning a plane intersecting said log channel upstream of a corresponding one of said rollers, said at least one monitoring scanner being operatively connected to said control center for forwarding real-time log position data concerning the position of a log;
wherein said control center will control said first and second actuators to move said rollers along said first and second directions respectively for engaging the peripheral surface of the log and for correcting a deficient position of a log being conveyed by said log positioning and conveying apparatus according to said data representing the shape of the log and to said real-time log position data received from said at least one monitoring scanner.

9. A log processing system as defined in claim 8,
further comprising a log-shape scanner linked to said control center and destined to scan a log for forwarding to said control center said data representing the shape of the log being conveyed through said log positioning and conveying apparatus.

10. A log processing system as defined in claim 9,
further comprising a log turner linked to said control center, for rotating a log about its log longitudinal axis.

11. A log processing system as defined in claim 8,
wherein said rotational axes of said rollers are parallel and horizontal.

12. A log processing system as defined in claim 11,
further comprising at least two additional rollers carried by said frame and each spacedly overlying a corresponding one of the first-named rollers and forming longitudinally successive pairs of vertically spaced-apart co-operating rollers therewith, wherein each roller of said pairs of co-operating rollers is controlled by a corresponding one of said third roller actuators to be rotated for conveying a log along said longitudinal axis towards said downstream end, and by corresponding ones of said first and second actuators to be displaced along said first and second directions respectively for engaging the peripheral surface of the log and correcting the position of the log according to said data representing the shape of the log and to said real-time log position data for positioning the log according to its predetermined downstream position as it is being conveyed towards said downstream end, whereby said dynamic log channel is defined between two rollers forming each said pair of co-operating rollers for receiving the log in said log channel, with the two rollers forming each said pair of co-operating rollers being destined to engage opposite sides of the peripheral surface of the log as it engages said log channel.

13. A log processing system as defined in claim 12,
wherein said open frame further comprises a number of roller units moveably mounted thereon, each said pair of co-operating rollers being carried by a corresponding roller unit; wherein each said second actuator is operatively connected to a corresponding one of said roller units; and wherein upon selective activation of said second actuators, said roller units will be independently displaced along said second direction, with said rollers being displaced in said second direction along with said corresponding roller unit.

14. A log processing system as defined in claim 13,
wherein said at least one monitoring scanner is an infrared optical detector.

15. A log processing system as defined in claim 12,
wherein said roller units each pivotally carry a pair of pivotable arms each controlled in its pivotal displacement by a corresponding one of said first roller actuators, each said arm of said pair of pivotable arms rotatably carrying a roller.

\* \* \* \* \*